United States Patent
Mangalvedkar et al.

(10) Patent No.: US 11,356,440 B2
(45) Date of Patent: Jun. 7, 2022

(54) AUTOMATED IOT DEVICE REGISTRATION

(71) Applicant: International Business Machines Corporation, Armonk, NY (US)

(72) Inventors: Amit Mohan Mangalvedkar, Bangalore (IN); Peter David Niblett, Whitchurch (GB); Mats Gothe, Norrkoping (SE); Jack Philip Boad, Essex (GB); Swati Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 16/205,254

(22) Filed: Nov. 30, 2018

(65) Prior Publication Data
US 2020/0177589 A1 Jun. 4, 2020

(51) Int. Cl.
*H04L 9/40* (2022.01)
*H04L 67/12* (2022.01)
*G06F 16/245* (2019.01)

(52) U.S. Cl.
CPC ........ *H04L 63/0876* (2013.01); *G06F 16/245* (2019.01); *H04L 63/20* (2013.01); *H04L 67/12* (2013.01)

(58) Field of Classification Search
CPC ..... H04L 63/0876; H04L 63/20; H04L 67/12; G06F 16/245
See application file for complete search history.

(56) References Cited

U.S. PATENT DOCUMENTS

| 6,499,017 | B1 | 12/2002 | Feibelman et al. |
| 9,210,534 | B1 * | 12/2015 | Matthieu ................. H04L 67/18 |
| 9,461,976 | B1 | 10/2016 | Smith et al. |
| 9,538,311 | B2 | 1/2017 | Baum et al. |
| 9,800,468 | B2 | 10/2017 | Smith et al. |
| 9,866,637 | B2 | 1/2018 | Doraiswamy et al. |

(Continued)

OTHER PUBLICATIONS

Wenquan Jin et al., "Resource Management Based on OCF for Device Self-Registration and Status Detection in IoT Networks," 2019, pp. 1-22. (Year: 2019).*

(Continued)

*Primary Examiner* — Luu T Pham
*Assistant Examiner* — Canh Le
(74) *Attorney, Agent, or Firm* — Christopher M. Pignato

(57) ABSTRACT

Automated registration of one or more IoT devices seeking connection to one or more IoT platforms using a secure provisioning service. The secured provisioning service verifies and administers connection credentials to each IoT device, ensuring legitimate devices cannot be impersonated or controlled by unauthorized personnel. The provisioning service matches the IoT devices and metadata of each IoT device to the provisioning rules. Connection credentials and/or rules defining each IoT device's access to IoT platforms are based on the provisioning rules of the rules registry. Matching each IoT device to one or more provisioning rules offers flexibility to dynamically add, delete or amend one or more rules in a complex rules-based system, allowing for automatic updates to the connection credentials of each IoT device, wherein each IoT device can be provisioned or re-provisioned using the most up to date set of new or amended rules.

17 Claims, 11 Drawing Sheets

(56) References Cited

U.S. PATENT DOCUMENTS

| | | | | |
|---|---|---|---|---|
| 2005/0114652 | A1* | 5/2005 | Swedor | H04L 9/3263 713/156 |
| 2007/0174113 | A1* | 7/2007 | Rowen | G06Q 10/00 705/14.1 |
| 2009/0178105 | A1* | 7/2009 | Feng | H04L 63/083 726/1 |
| 2014/0032410 | A1* | 1/2014 | Georgiev | G06Q 20/405 705/44 |
| 2014/0244001 | A1* | 8/2014 | Glickfield | H04L 67/16 700/33 |
| 2017/0006135 | A1* | 1/2017 | Siebel | H04L 67/2833 |
| 2017/0201585 | A1 | 7/2017 | Doraiswamy | |
| 2017/0284691 | A1 | 10/2017 | Sinha et al. | |
| 2018/0091506 | A1 | 3/2018 | Chow et al. | |
| 2018/0109650 | A1 | 4/2018 | Berdy et al. | |
| 2018/0219887 | A1* | 8/2018 | Luo | G06N 7/005 |
| 2018/0234318 | A1* | 8/2018 | Cox | H04Q 9/00 |
| 2018/0284987 | A1* | 10/2018 | Lazier | G06F 3/0613 |
| 2019/0334869 | A1* | 10/2019 | Grant | H04L 61/305 |
| 2019/0373056 | A1* | 12/2019 | Kalach | H04L 67/1095 |
| 2020/0076896 | A1* | 3/2020 | Anu | H04W 4/70 |
| 2020/0153697 | A1* | 5/2020 | Turner | H04L 63/083 |
| 2020/0162503 | A1* | 5/2020 | Shurtleff | H04L 41/0893 |

OTHER PUBLICATIONS

Thinagaram Perumal et al. "IoT Device Management Framework for Smart Home Scenarios," 2015, pp. 54-55. (Year: 2015).*

Mell et al., "The NIST Definition of Cloud Computing", Recommendations of the National Institute of Standards and Technology, NIST Special Publication 800-145, Sep. 2011, 7 pages.

"IoT Device Management Market Size, Share & Trends Analysis Report by Component (Solutions, Services), by Solution, by Service, by Organization Size (SME, Large Enterprise), by Vertical, and Segment Forecasts, 2018-2025", Grand View Research, Published Date: Mar. 2018, 9 pages, <https://www.grandviewresearch.com/industry-analysis/iot-device-management-market>.

* cited by examiner

```
metadata {
    "createdBy" : "c-7x9hmj-9gqyt56kdil",
    "created" : "2018-12-12T15:00z",
    "typeID" : "LIGHTING BLOOM",
    "preregristration_ID" : "FJ7BE0D",
    "classID" : "Device",
    "callbackURL" : "https://org.ibmcloud.com/api/bloom",
    "customRule" : "deviceID = preregistration_ID",
    "latitude" : "41.1265° N",
    "longitude" : "73.7140° W",
    "locality" : "Armonk, NY",
}
```

FIG. 6a

```
{
    {
        "ruleId" : "rule01",
        "description" : "Contains the various lists",
        "rule" : {
            "list" : {
                "approveList" : [
                    "ipAddress" : ["100.100.100.100" to "100.100.100.999"],
                    "macAddress" : ["aaaaaa", "bbbbbb"]
                ]
                "bannedList" : [
                    "ipAddress" : ["102.102.102.102", "103.104.104.105"],
                    "macAddress" : ["cccccc", "dddddd"]
                ]
            }
        }
    },
    {
        "ruleId" : "rule02",
        "description" : "Contains the password policies",
        "rule" : {
            "passwordPolicy" : {
                "concat" : [ "typeID", "randomNumber", "timestamp"]
            }
        }
    },
}
```

FIG. 6b

AUTOMATED IOT DEVICE REGISTRATION

TECHNICAL FIELD

The present disclosure relates generally to the field of managing computer networks, and more particularly to the automated registration of internet-of-things devices to a computer network.

BACKGROUND

The internet of things (IoT) is a system of interrelated computing devices, mechanical or digital machines, objects, animals and/or people that are provided with unique identifiers (UIDs). The IoT allows for the ability to transfer data over computer networks without requiring human-to-human or human-to-computer interaction. The device or object (i.e., the "thing") in the internet of things, can be a person with a heart monitor implant, animals with a microchip implant or transponder, home appliances, lightbulbs, an automobile with built in sensors and/or any natural or synthesized object that can be assigned an IP address that can be capable of transferring data over a computer network.

An IoT ecosystem can comprise internet-enabled devices that use embedded processors sensors and communication hardware to collect, send and act on data acquired from the IoT device's surrounding environment. IoT devices can share the data they collect by connecting to an IoT gateway or other edge device, wherein the data can be sent to a cloud computing environment or analyzed by locally operating computer systems. IoT devices can communicate with one another or other related devices on the computer network. The connectivity, networking and communication protocols used, can allow for the IoT devices to interact without much, if any human interaction, and be used to monitor business processes, improve customer experiences, enhance productivity, influence business decisions and integrate or adapt business models.

SUMMARY

A first embodiment of the present disclosure provides a computer-implemented method comprising the steps of receiving a registration request from an internet-of-things (IoT) device; receiving credentials and a set of metadata from the IoT device; verifying the credentials are authentic; transmitting the set of metadata and a system call to a rules engine, requesting to query of a rules registry for one or more rules applicable to the IoT device; querying the rules registry for one or more rules that match the set of metadata of the IoT device; computing a rules statement in response to the system call as a function of querying the rules registry; registering the IoT device with connection credentials, and a device ID as a function of an expression of the one or more rules; and transmitting the connection credentials, and the device ID to the IoT device.

A second embodiment of the present disclosure provides a computer system comprising a processor; an internet-of-things (IoT) device placed in communication with the processor; and a computer-readable storage media coupled to the processor, wherein the computer readable storage media contains program instructions executing a computer-implemented method comprising the steps of: receiving a registration request from the IoT device; receiving credentials and a set of metadata from the IoT device; verifying the credentials are authentic; transmitting the set of metadata and a system call to a rules engine, requesting to query of a rules registry for one or more rules applicable to the IoT device; querying the rules registry for one or more rules that match the set of metadata of the IoT device; computing a rules statement in response to the system call as a function of querying the rules registry; registering the IoT device with connection credentials, and a device ID as a function of an expression of the one or more rules; and transmitting the connection credentials, and the device ID to the IoT device.

A third embodiment of the present disclosure provides a computer program product comprising: one or more computer readable storage media having computer-readable program instructions stored on the one or more computer readable storage media, said program instructions executes a computer-implemented method comprising the steps of: receiving a registration request from an internet-of-things (IoT) device; receiving credentials and a set of metadata from the IoT device; verifying the credentials are authentic; transmitting the set of metadata and a system call to a rules engine, requesting to query of a rules registry for one or more rules applicable to the IoT device; querying the rules registry for one or more rules that match the set of metadata of the IoT device; computing a rules statement in response to the system call as a function of querying the rules registry; registering the IoT device with connection credentials, and a device ID as a function of an expression of the one or more rules; and transmitting the connection credentials, and the device ID to the IoT device.

BRIEF DESCRIPTION OF THE DRAWINGS

FIG. 6a depicts an embodiment of an example of a snippet of metadata.

FIG. 6b depicts an embodiment of an example of a snippet of a set of rules.

DETAILED DESCRIPTION

Overview

Figure 1A:
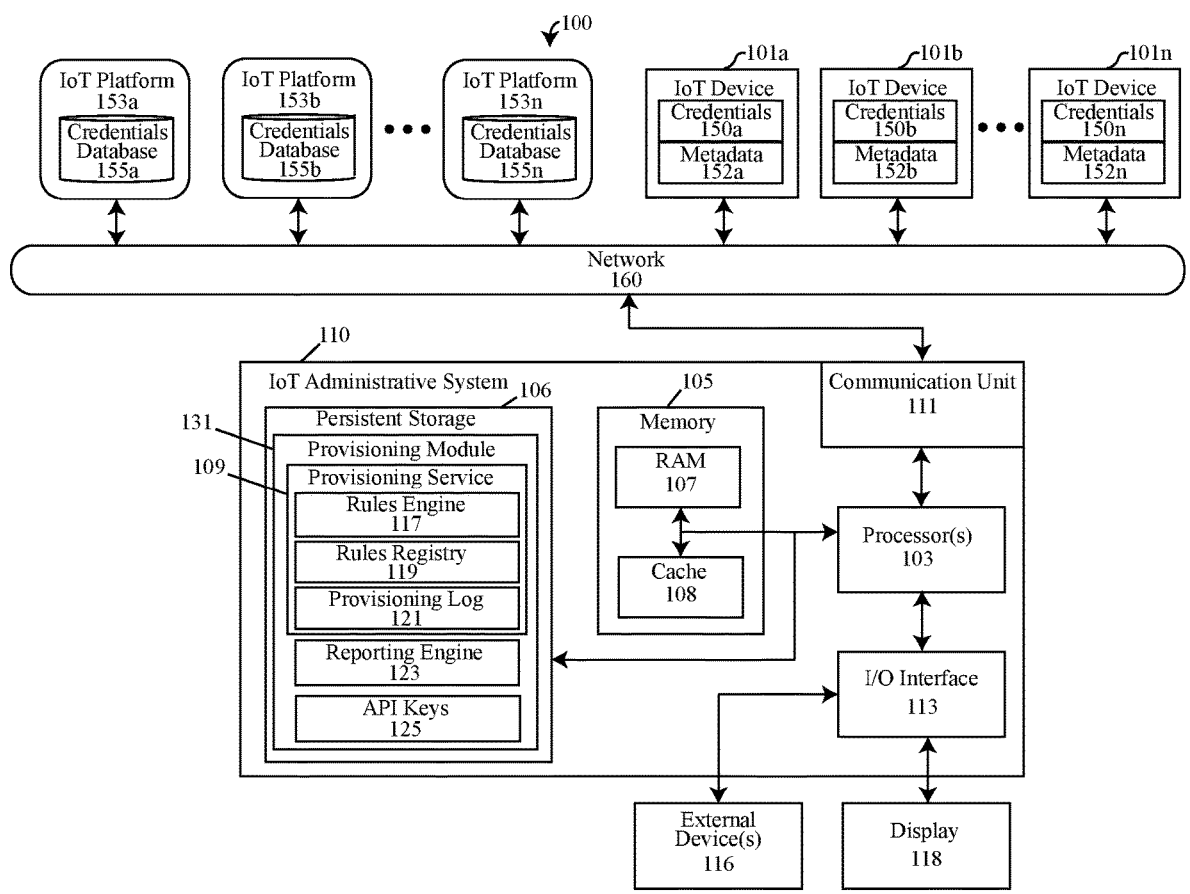
FIG. 1a depicts a functional block diagram describing an embodiment of a computing environment in accordance with the present disclosure.

The term "Internet-of-Things" (abbreviated "IoT") may refer to an ever-growing network of physical objects and devices that may be equipped with electronic circuitry and hardware, allowing for the objects and devices to obtain IP addresses and achieve connectivity to the Internet or another type of computer network 160. IoT devices 101 connected to the Internet or another type of computer network 160 allow for communication to occur between to IoT device 101, the Internet, network enabled computing systems, or devices.

The IoT provisioning solutions described by the various embodiments discussed within this disclosure recognize, based on the current and expected volume of IoT devices 101, traditional provisioning methods, systems and program products will not scale nearly fast enough to meet the provisioning demands of the billions of IoT devices 101. Manual provisioning and scaling is neither efficient nor effective to meet IoT device 101 registration demands. Embodiments of the present disclosure provide solutions to the deficiencies of currently available technology and methods by automating IoT device 101 registration. Embodiments of the present disclosure may use a secured provisioning service to automate the registration of each IoT device 101, ensure that legitimate IoT devices 101 cannot be impersonated or controlled by unauthorized personnel, and provide flexibility through the use of a configurable rules-based systems to dynamically change provisioning rules (referred throughout as simply the "rules") over time while being able to automatically re-provision IoT devices based on new or amended sets of rules ("amended rules").

Embodiments of the present disclosure may automate IoT device 101 registration to one or more IoT platforms 153, using a provisioning service 109. The IoT provisioning service 109 may automate the provisioning process and control the access between the IoT device 101 and an IoT platform 153. Embodiments of the provisioning service 109 may maintain a rules registry 119 comprising each rule or rule set describing how to provision IoT devices 101 that are seeking to connect to an IoT platform 153. The provisioning service 109 may act as the first point of contact between un-provisioned IoT devices 101 and the IoT platform 153.

Each IoT device 101 connecting to the provisioning service 109 for the first time may request registration with an IoT platform 153. The un-provisioned IoT device 101 may be initially directed (or re-directed) to the provisioning service 109 via a URL or other network address protocol built into the IoT device 101. For example, by the manufacturer or company maintaining the IoT device 101. The URL may point the IoT device 101 to the provisioning service 109 and/or an IoT platform 153 to complete the registration procedure. The unprovisioned IoT device 101 may connect to the URL or network address and transmit a request to the provisioning service 109.

Embodiments of the IoT device 101 may transmit the provisioning request along with an initial set of credentials 150 stored by the IoT device 101 (i.e., in the form of a digital certificate, security token or signed objects) and a set of metadata 152 describing one or more parameters, attributes or identifying information about the IoT device 101 making the provisioning request. The provisioning service 109 receiving the provisioning request and metadata 152 may verify whether the incoming credentials 150 are valid before going any further with registering the IoT device 101. Credentials 150 that are invalid or inauthentic may result in the immediate termination of the request by the provisioning service 109.

Credentials 150 that are initially verified by the provisioning service 109 may proceed through the registration process. Embodiments of the provisioning service 109 may call the rules engine 117 to query the rules registry 119 for one or more provisioning rules corresponding to the IoT device 101, connection credentials 150 and the metadata 152 provided by the IoT device 101. The rules engine 117 may match the provisioning rules of the rules registry 119 with the IoT device 101, connection credentials and the set of metadata 152. The rules engine 117 may calculate a rules statement instructing the provisioning service 109 how to express the provisioning rules to and may include provisioning instructions directed toward one or more parameters or attributes of the IoT device 101 being registered, including the assignment of a device ID, device type, IP address, access permissions and any custom rules for the IoT device 101. Based on the rules statement, the provisioning service 109 may issue new or updated connection credentials 150 to the IoT device 101 in accordance with the rules statement generated by the rules engine 117.

Embodiments of the provisioning service 109 may also receive additional information stored by the IoT platform 153, wherein registration is sought by the IoT device 101. The provisioning service 109 may request additional metadata 152 and information from credentials 150 stored by IoT platform 153. The second set of metadata 152 and credentials 150 may act as a second form of validation to ensure that the IoT device 101 seeking registration is authorized to access the IoT platform 153.

Upon receiving the request from the provisioning service 109, the IoT platform may match the IoT device 101 information received from the provisioning service 109 with metadata 152 and credentials 150 stored by the IoT platform 153. The metadata 152 and credentials 150 stored by the IoT platform 153 may be transmitted back to the provisioning service 109, wherein this second set of metadata 152 received from the IoT platform 153 may be further matched to one or more rules of the rules registry 119. The rules engine 117 may create a rules statement for provisioning the IoT device 101 based on the set of rules that matches both the metadata 152 transmitted from the IoT device 101 to the provisioning service 109 and the second set of metadata 152 stored by the IoT platform 153. Using the rules statement created by the rules engine 117, as a function of the provisioning rules maintained by the rules registry 119, the provisioning service 109 may provision the IoT device 101, set one or more IoT device parameters or attributes, and provision the IoT device 101 credentials 150 for connecting to the IoT platform 153.

Embodiments of the provisioning service 109 may dynamically provision and re-provision each IoT device 101 based on whether there are changes to the provisioning rules stored by the rules registry 119. An IoT administrative system 110 may connect to the provisioning service 109, access the rules registry and add, delete or modify provisioning rules maintained by the rules registry 119. As provisioning rules are added, deleted or modified, the provisioning service 109 may re-provision IoT devices 101 currently registered to one or more IoT platforms 153, in accordance with the added, deleted or modified rules. Changes to the device ID, connection credentials, custom rules, etc. which were previously provisioned to the IoT devices 101 may be automatically updated to reflect the current set of provisioning rules stored by the rules registry 119.

System for Automated IoT Device Registration

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1a-4 depict diagrams of a computing environment 100, 180, 190, 200, 350 capable of automating IoT device registration using a set of programmable and/or dynamically adjustable rule sets, in accordance with the embodiments of the present disclosure. Embodiments of computing environment 100, 180, 190, 200, 350 may include a plurality of computer systems and devices interconnected via a computer network 160, such as a plurality of IoT devices 101a, 101b, 101c . . . 101n (hereinafter referred to generally as "IoT device 101"), an IoT administrative system 110, a provisioning server 130 that may be loaded with a provisioning service 109, and/or an IoT platform 153a, 153b, 153c . . . 153n (hereinafter referred to generally as "IoT platform 153." As shown in FIGS. 1a-4, the number of IoT devices 101 and IoT platforms 153 may not be limited to the number depicted in the drawings. The number of IoT devices 101, IoT platforms 153 or any other duplicated components or systems being presented by the drawings, may be any number supported by network 160 and the computing environments 100, 180, 190, 200. The $n^{th}$ number of repeated device, component, system, etc., for example the IoT device 101n or the IoT platform 153n identifies the last element in a plurality of duplicate systems, devices, or components described herein and not necessarily the second, third or fourth in the repeating sequence of components, devices, systems, etc. shown in the drawings.

Figure 7:
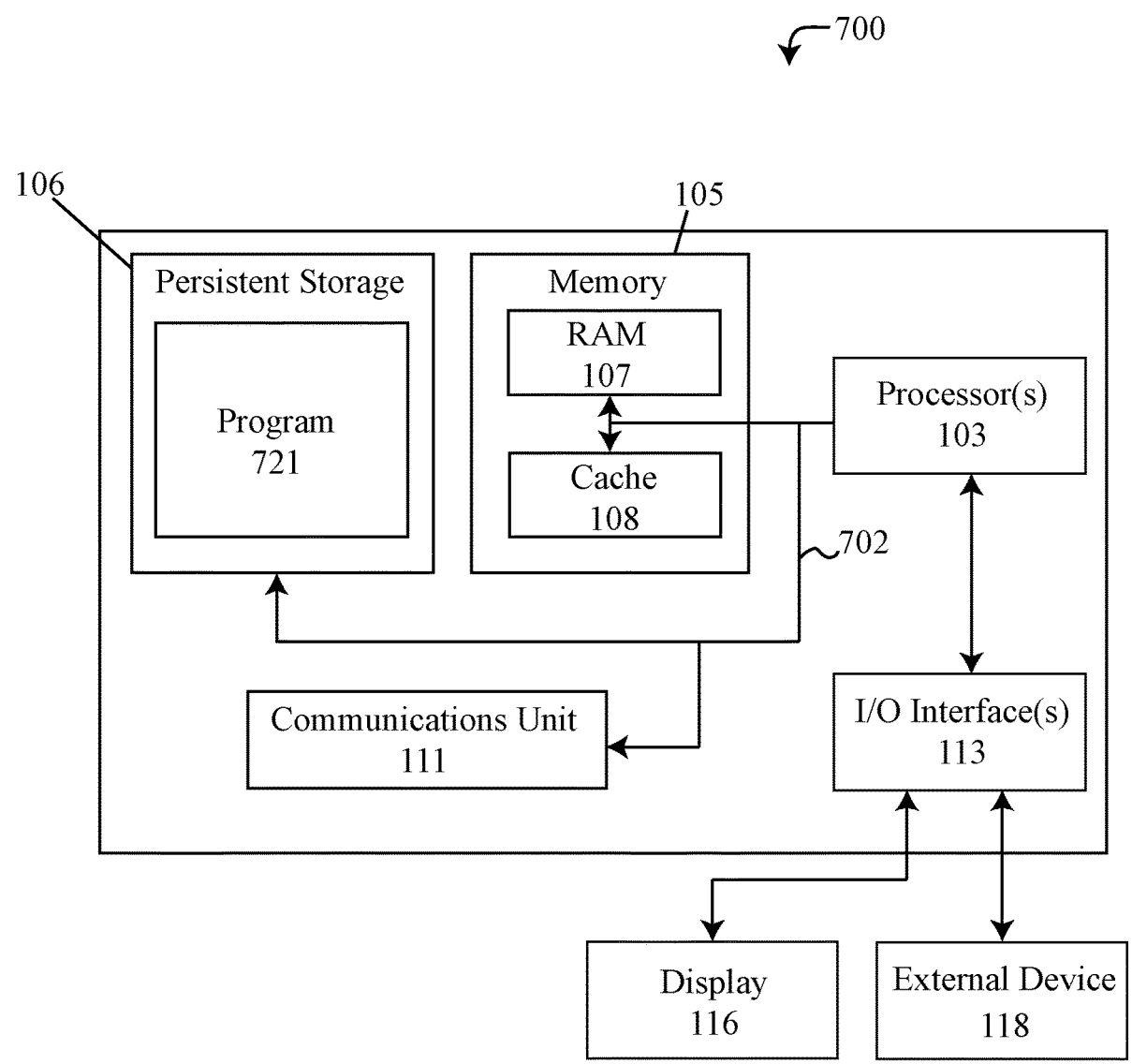
FIG. 7 depicts an embodiment of a block diagram of internal and external components of a computer system in accordance with the embodiments of the present disclosure.

Embodiments of the IoT device 101, IoT administrative system 110, IoT platform 153 and provisioning server 130 may each be a specialized computer system comprising specialized configurations of hardware, software or a combination thereof as shown and described in FIGS. 1-4a of the present disclosure and in embodiments described herein. Embodiments of the IoT device 101, IoT administrative system 110, IoT platform 153 and provisioning server 130 may not only comprise the elements of the systems and devices depicted in FIGS. 1-4a but may also incorporate one or more elements of a computer system 700, as shown in FIG. 7 and described in the COMPUTER SYSTEM section detailed below. One or more elements of the computer system 700 may be integrated into the specialized computer systems of computing environment 100, 180, 190, 200, 350 including the IoT device 101, IoT administrative system 110, IoT platform 153 and/or provisioning server 130.

Embodiments of the IoT administrative system 110, provisioning server 130, IoT platform 153 and other network accessible systems may be desktop computers, laptop computers, tablet computers, smartphones, server computers, or any other computer system known in the art. IoT devices 101 may be any physical device or object embedded with electronics, circuitry, software, sensors, actuators and/or connectivity hardware which may enable IoT devices 101 to connect to a computer network 160, collect data or exchange data. In some embodiments of the computing environments 100, 180, 190, 200, 350 IoT devices 101, IoT administrative system 110, IoT platforms 153, provisioning servers 130 and other network accessible systems, may represent computer systems utilizing clustered computers and components to act as a single pool of seamless resources when accessed through network 160. For example, such embodiments may be used in data center, cloud computing, storage area network (SAN), and network attached storage (NAS) applications.

In certain embodiments, the IoT device 101, IoT administrative system 110, IoT platform 153, provisioning server 130 and other network accessible systems may represent virtual machines provisioned by a host computer on the network 160. For example, IoT administrative system 110, provisioning server 130 and/or IoT platform 153 may host a plurality of virtual machines accessing and/or provisioning each IoT device 101. In some embodiments, an IoT device 101 may have embedded virtualization characteristics, allowing for an IoT device 101 to be provisioned with a management layer along with separate slots capable of being assigned one or more types of functionality to be provisioned thereto. An IoT device 101 that has virtualization capabilities, may be capable of being provisioned for a plurality of functions on the original hardware of the IoT device 101. In general, IoT device 101, IoT administrative system 110, IoT platform 153, provisioning server 130 and other network accessible systems may be representative of any electronic devices, or combination of electronic devices, capable of executing machine-readable program instructions, as described in greater detail with regard to FIG. 5a-5b.

Embodiments of the IoT device 101, IoT administrative system 110, IoT platform 153, provisioning server 130 and other network accessible systems may each be connected and placed into communication with one another over a computer network 160. Embodiments of the computer network 160 may be constructed using wired, wireless or fiber optic connections. As shown in the exemplary embodiments, the IoT device 101, IoT administrative system 110, IoT platform 153, provisioning server 130 and other network accessible systems, may connect and communicate over the network 160 using a communication unit 111, such as a network interface controller or other network communication hardware. Embodiments of the communication unit 111 may implement specialized electronic circuitry allowing for communication using a specific physical layer and a data link layer standard. For example, Ethernet, Fiber channel, Wi-Fi or Token Ring.

Communication unit 111 may further allow for a full network protocol stack, enabling communication over network 160 to the group of computer systems or other computing hardware devices linked together through communication channels. The network 160 may facilitate communication and resource sharing among IoT devices 101, IoT administrative systems 110, IoT platforms 153, provisioning servers 130 and other network accessible systems connected to the network 160 (for example, network accessible storage media). Examples of network 160 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing networks are a model of service delivery for enabling convenient, on-demand network 160 access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
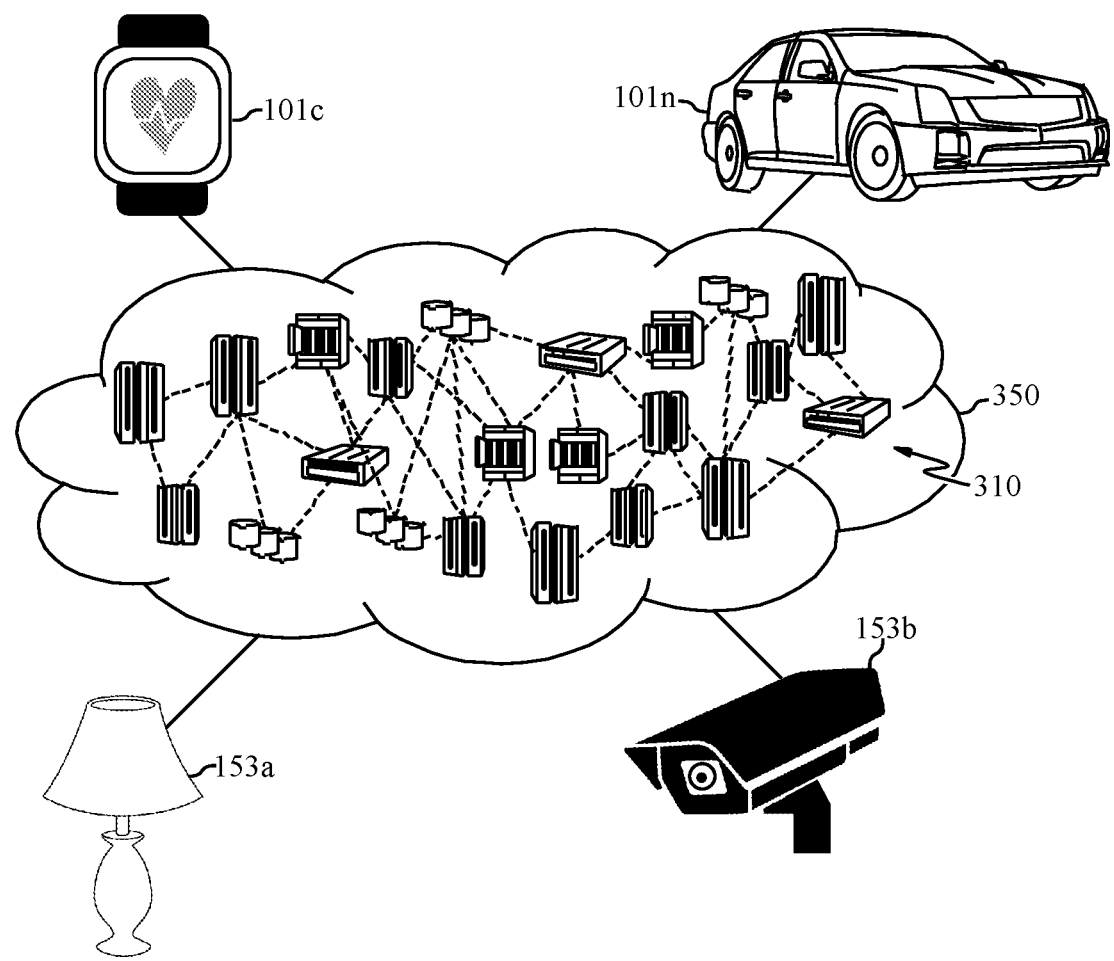
FIG. 3 depicts an embodiment of a cloud computing environment in accordance with the present disclosure.

Referring to the drawings, FIG. 3 is an illustrative example of a cloud computing environment 350. As shown, cloud computing environment 350 includes one or more cloud computing nodes 310 with which IoT devices 101 can be used by cloud consumers, for example, a lighting system 101a, a camera system 101b, a medical monitoring device 101c, an automobile system 101n and/or any physical object equipped with a computing system or computerized components, may communicate. Nodes 310 may communicate with one another and may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of client devices, including IoT devices 101 connected cloud computing environment, are intended to be illustrative only and that computing nodes 310 and cloud computing environment 350 can communicate with any type of computerized device over any type of network 160 and/or network addressable connection (e.g., using a web browser).

Figure 4:
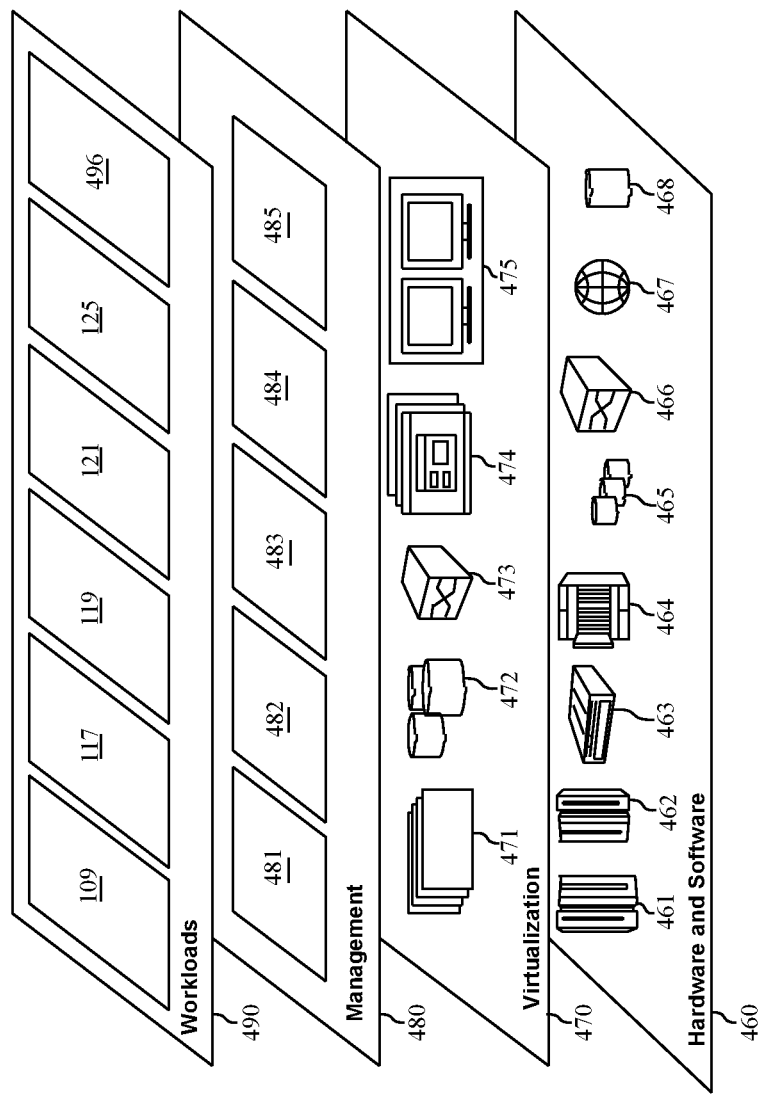
FIG. 4 depicts an embodiment of abstraction model layers of a cloud computing environment in accordance with the present disclosure.

Referring now to FIG. 4, a set of functional abstraction layers provided by cloud computing environment 350 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 350. Metering and pricing 482 provide cost tracking as resources are utilized within the cloud computing environment 350, and billing or invoicing for consumption of these resources. In one example, these resources can include application software licenses. Security provides identity verification for cloud consumers and tasks, as well as protection for data and other resources. User portal 483 provides access to the cloud computing environment 350 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: provisioning service 109, rules engine 117, rules registry 119, provisioning log 121, reporting engine 123, and data analytics processing 496.

Embodiments of the IoT devices 101, IoT administrative system 110, IoT platform 153 and provisioning server 130 may include one or more processes, services, engines and/or modules specializing in performing one or more specific tasks or functions associated with automating IoT device 101 registration and/or virtualization of IoT device 101 functions. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 721, program code or linked to program code containing specific programmed instructions loaded into a memory 105 device or persistent storage 106 device of a computer system operating in computing environment 100, 180, 190, 200, 350.

Embodiments of the computing environments 100, 180, 190, 200, 350, including one or more systems, sub-systems, processes, services, engines and/or modules, whether hardware, software, or a combination thereof, may perform the functions and tasks associated with registering IoT devices 101 to access an IoT platform 153, including provisioning and de-provisioning IoT devices 101 in a cloud computing environment. More specifically, embodiments of each computing system operating within a computing environment 100, 180, 190, 200, 350, including one or more IoT devices 101, IoT administrative system 110, IoT platform 153 and provisioning server 130 may perform the functions associated with automating the registration of IoT devices 101 connected to network 160, based on programmable rules and rule sets stored by a rules registry 119 which may be dynamically changed, amended and/or updated.

Figure 1B:
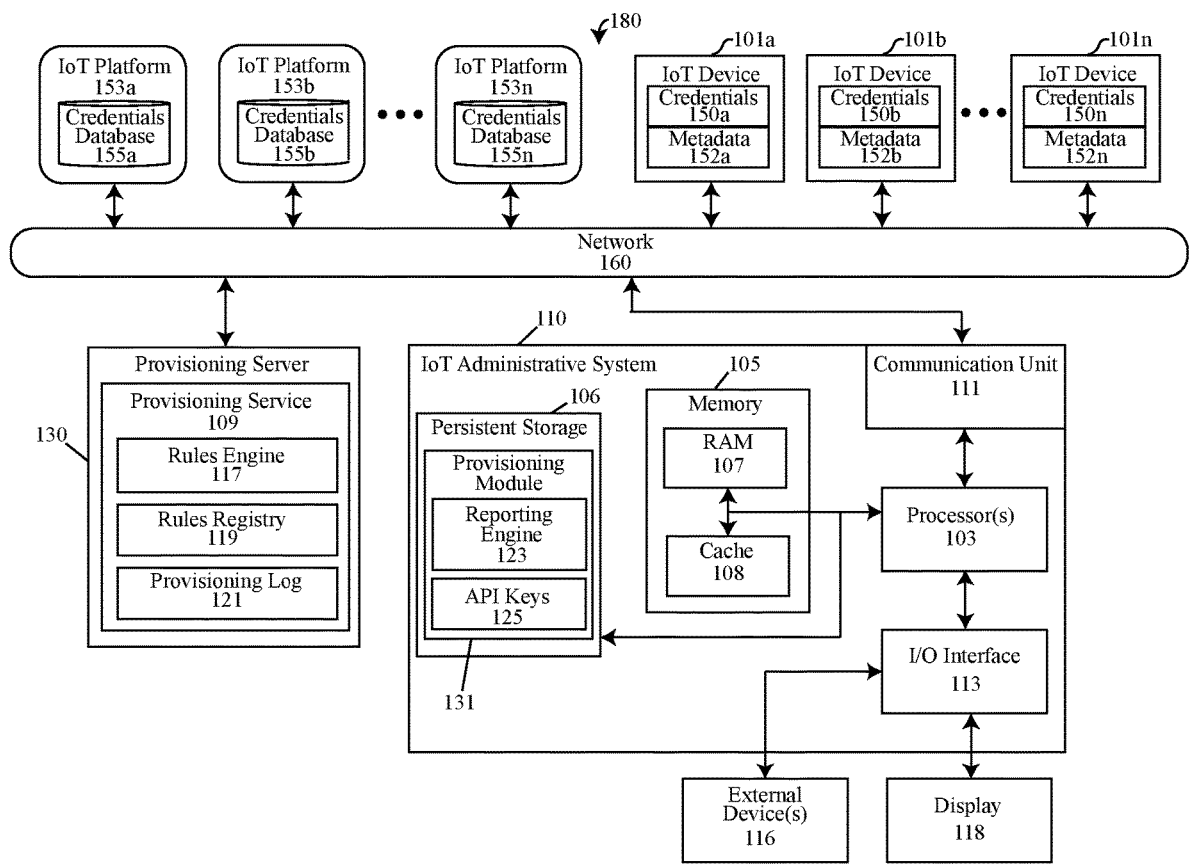
FIG. 1b depicts a functional block diagram describing an alternative embodiment of a computing environment in accordance with the present disclosure.
Figure 1C:
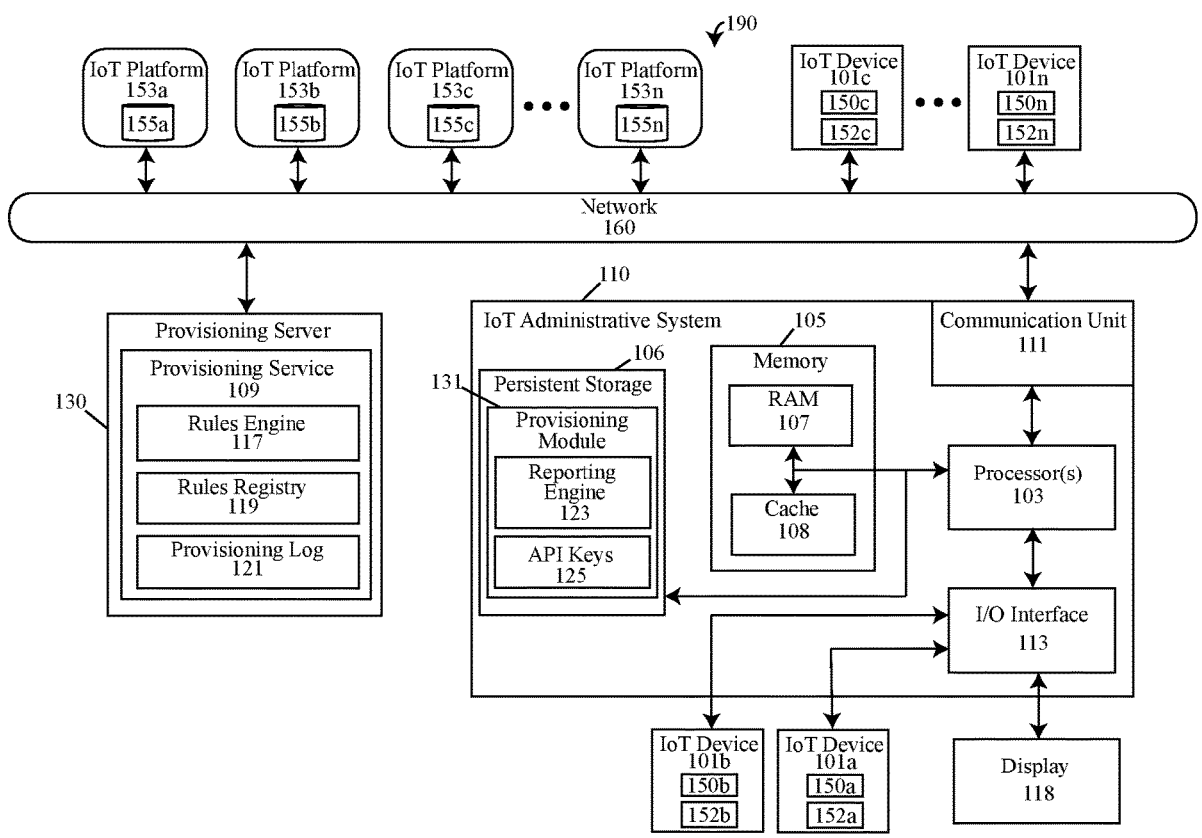
FIG. 1c depicts a functional block diagram describing a second alternative embodiment of a computing environment in accordance with the present disclosure.

Referring to the drawings, FIGs 1a-1c depict embodiments of computing environments 100, 180, 190, 200, 350, which may include one or more IoT devices 101 requesting to connect to an IoT platform 153 by submitting a request for registration of the IoT device 101 via network 160. Embodiments of an IoT device 101 may refer to physical objects that may be embedded with technology allowing for network 160 communication with other IoT devices 101, computer systems, servers, gateways and the environments external to the IoT device 101. IoT devices 101 may be connectable to the Internet and may include properties, parameters and attributes that may be typical of a network enabled computer system, such as an IP address and MAC address. Examples of IoT devices 101 can include, but are not limited to security systems, speakers, home appliances, toys, televisions, thermostats, smoke alarms, cameras, sensors, lighting systems, automobiles, or any other object that can be embedded with network enabled communication technology.

Embodiments of IoT devices 101 may be able to store network connection information and authenticating documentation within a memory 105 or persistent storage 106 device, onboard the IoT device 101 or accessible via a network accessible storage device. Embodiments of the connection information stored by the IoT device 101 may be described as connection credentials 150a, 150b, 150c . . . 150n (referred herein to generally as "credentials 150"). Embodiments of the credentials 150 may store authentication information that may be used for accessing the IoT platform 153. Examples of credentials can include user/password combinations, a security token or a digital certificate. One or more combinations of credentials may be implemented for added security.

Credentials 150 may allow for computing systems, platforms, and networks to verify the authenticity of the IoT device 101, to ensure that unauthorized devices are not impersonating a legitimate IoT device 101. For example, digital certificates, may use public keys, private keys or digital signatures issued by a digital certificate manager responsible for maintaining the credentials 150 the IoT device 101. The digital keys and/digital signature can be matched to digital certificates being presented by the IoT device 101 at the time of IoT device 101 registration, to verify authenticity of the credentials 150. Examples of digital certificates may include server or client certificates, which may communicate securely using secure sockets layer (SSL), object signing certificates comprising a digitally signed object, and signature verification certificates. The most common format for a public key certificate that may be used may be a digital certificate issued in the X.509 format.

Credentials 150, maintained as digital certificates, security tokens and default user names/passwords may be pre-loaded onto an IoT device 101 by the manufacturer, distributor or administrator of the IoT device 101. Pre-loaded credentials 150 may allow for the IoT device 101 to reach out to an IoT platform 153 in order to register the IoT device 101 for the first time and prove that that the IoT device 101 is authentic. In some embodiments, during the registration of the IoT device 101, credentials 150 may be modified by a user or administrator of the provisioning service 109, IoT administrative system 110 and/or IoT platform 153. For example, during the registration of the IoT device 101, a new user name/password combination may be set by a user or administrator of the IoT device 101 in order to access IoT platform 153. Alternatively, during registration of the IoT device 101, the provisioning service 109 can issue new credentials 150 by issuing a new digital certificate or security token to the IoT device 101 as part of the registration process.

In some embodiments, the IoT device 101 may be pre-programmed or embedded with a URL or other network address protocol which may point the IoT device 101 to the IoT platform 153 associated with using the IoT device 101. Upon navigating to the URL or network address embedded in the IoT device 101, the IoT device 101 may connect to a provisioning service 109 and initiate the automate the registration of the IoT device 101. In alternative embodiments, the IoT device 101 may initially be directed toward the URL of an IoT platform 153, however, the IoT device 101 may be identified as an unregistered device and subsequently be re-directed to the provisioning service 109 to complete the registration process first before accessing the IoT platform 153.

In some embodiments of the IoT device 101, the IoT device 101 may include a set of metadata 152 stored by the IoT device 101 and/or retrievable by the IoT device 101 via the network 160. For example, stored by a memory 105, persistent storage 106, network accessible storage device, or repository connected to network 160. Embodiments of the metadata 152 may store the IoT device 101 information in a readable format, markup language or schema. For example, the metadata 152 may be implemented using JSON, XML, RuleML, JSONata, or Business Rules Management Markup Language. Embodiments of the metadata 152 may describe one or more parameters, attributes or properties of the IoT device 101. For example, metadata 152 may include a pre-registered device ID, device type, device manufacturer, organization ID, model ID, IP address, MAC address, a callback URL, callback rules, geolocation, authentication method, custom rules or any other parameters, attributes and properties that may be communicated by the IoT device 101.

Referring to the drawings, FIG. 6*a* depicts an example of a snippet of a set of metadata 152 that may be stored by an IoT device 101. As shown in FIG. 6*a*, a plurality of different attributes, parameters, and properties (referred to herein collectively as "elements") can be set and defined in the metadata 152. Embodiments of the metadata 152 may identify the IoT device 101 to a provisioning service 109 during device registration and may be used to match the IoT device 101 to the rules or set of rules that can be applied to the IoT device 101. Examples of metadata 152 elements that can be defined can include a description of the creator of the metadata ("createdBy"), a description of when the metadata 152 was created ("created"), the device type being identified ("typeID"), a device ID describing the IoT device 101 prior to being registered by the provisioning service 109 ("pre-registration_ID), a classification of the IoT device 101 as either a device or gateway ("classID"), a pre or post-registration callback URL ("callbackURL"), any additional customized rules that may added by the creator, manufacturer, administrator or third party having access to write to the metadata 152 ("customRule") and the geolocation of the IoT device 101 including the "latitude", "longitude" and/or a description of the "locality."

The element, "createdBy", of the metadata 152 may provide a name or unique ID, whether encrypted or unencrypted, describing the creator of the metadata 152. The creator identified by the createdBy element may describe the company, manufacturer, administrator or an organization associated with the IoT device 101. In some embodiments, where the name is unencrypted, the name of the creator may be evident from the metadata 152, for example the createdBy element may plainly state the creator's name, i.e., John Doe. In other embodiments, such as the example, in FIG. 6*a*, the creator's name or organization ID may be obscured as an encrypted key, such as the alphanumeric key displayed in the createdBy field shown in the figure.

The "created" element of the metadata 152 may describe the date and time the metadata 152 was first created and/or the date and/or time the metadata 152 was last updated by a creator or updater. In some embodiments of the metadata 152, additional elements of the metadata may include a "updated" element as well as an "updatedBy" element. The updated, created, createdBy, and updatedBy elements may be useful for determining whether or not a particular IoT device 101 has had the metadata 152 tampered with by an unauthorized user. An example, of one or more red flags that may alert a provisioning service 109 that the metadata 152 may be inauthentic may include an encrypted createdBy or updatedBy key that does not match a key of an authentic user having permission to create or amend the metadata 152, a created date/time or an updated date/time that is inconsistent with the manufacturing, programming protocols, and/or the serial number associated with the IoT device 101.

Embodiments of the "typeID" of the metadata 152 may describe the type of IoT device 101 associated with the metadata 152. For example, the typeID may be described by the IoT device's 101 model name, product name, a generic descriptor of the device itself, a codename or a customized typeID that may be set by the manufacturer, user or administrator having permission to access the metadata 152. The typeID may be used by the provisioning service 109 as a categorization attribute and/or to determine whether or not one or more features of the IoT device 101 may be applicable to a certain type of IoT device 101. For example, a lighting device such as an IoT-enabled light bulb may have different features or attributes than an IoT-enabled washing machine. A provisioning service 109 may maintain records of IoT devices 101 categorized by typeID and device category, wherein certain categorizations are provisioned one or more specific resources on the IoT platform 153 during the registration period. Therefore, the typeID may be useful to the provisioning service 109 for categorizing the different IoT devices 101 and determining which rules of the rules registry 119 may actually apply to the different categories of IoT device 101 types.

The metadata 152 element of a "preregistration_ID" may describe the identifying name of the unregistered IoT device 101 visible to the systems of the network 160 when the IoT device 101 connects to the network 160, the IoT platform 153 or the provisioning service 109 for the first time. Embodiments of the preregistration_ID could be any name desired by the user, administrator, manufacturer or third party having access to the metadata 152 of the IoT device 101. For example, the pre_registrationID can be a device name, product name, serial number, generic device descriptor, an alpha-numeric key, etc. Upon registration of the IoT device 101 by the provisioning service 109, the preregistration_ID may be amended or assigned a new device ID, programmed as a deviceID, which can be visible to the systems connected to network 160. In alternative embodiments, the preregistration_ID may be kept as the deviceID when a new IoT device 101 is registered. Whether or not the pre-registration_ID is maintained or not, post registration, may depend on the rules of the rules registry 119 and/or customized rules ("customRule") of the IoT device 101. As seen in the example of the metadata 152 depicted in FIG. 6*a*, a customRule element of the metadata 152 could be used to define the deviceID at the time of registration to the pre-registration_ID, when the rules registry 119 may have otherwise defined the deviceID different post registration of the IoT device 101.

Embodiments of the preregistration_ID element of the metadata 152 may be one element of a plurality of elements that may be useful for assessing whether an IoT device 101 should be registered to an IoT platform 153 and which rules should be applied by the rules engine 117. For example, the rules registry 119 being accessed by the rules engine 117 may maintain a list of preregistration_IDs on an approved list and/or a banned list. When a new IoT device 101 requests registration, the rules engine 117 may query the rules registry 119 for the approved list and banned list of IoT devices 101. If the preregristration_ID of the IoT device 101 seeking registration matches the approved list of preregistration_IDs, the provisioning service 109 may proceed with the registration process. Likewise, if the preregistration_ID of the IoT device 101 seeking registration matches a preregistration_ID on the banned list, the IoT device 101 may be denied registration by the provisioning service 109. Moreover, if a preregistration_ID is neither on an approved list or banned list, the preregistration_ID can be added to the appropriate list in accordance with the rules of the rules registry 119, allowing for duplicate devices having the same preregistration_ID to be accepted or denied registrations based on the updated approved list or banned list.

Embodiments of the metadata 152 may further comprise a callbackURL element. The callbackURL may perform a function or task of allowing an IoT device 101 to make a preregistration or post-registration action. The callback URL may be a web page or network address that may act as a home destination for the IoT device 101 to return to after a script of executable code is executed or links two different functions and/or programs 721 are executed. The callback URL may follow callback rules to direct a user or administrator registering the IoT device 101 to a web page to perform a dynamic action that may have been triggered over the course of registration by the provisioning service 109 or in response to the IoT device 101 accessing one or more features of the IoT platform 153. For example, the IoT device 101 may use the callback URL to send an IoT device 101 status, confirm registration, report IoT device 101 registration denial, perform IoT device 101 updates, etc.

In some embodiments of the metadata 152, a geolocation of the IoT device 101 may be described. The recorded geolocation may be the current location of the IoT device 101 and/or the geolocation may display the geographic location of the IoT device 101 when the metadata 152 was created or previously updated. Embodiments of the geolocation can be split into one or more elements of the metadata 152, as shown in FIG. 6a. For example, the geolocation can include an element of latitude, longitude and/or a written locality (i.e., a city and state or an entire physical address). Embodiments of the geolocation element of the metadata 152 may be trigger one or more rules of the rules registry 119. For example, some rules for the IoT device 101 can be triggered when an IoT device 101 is physically present with an established geofence having a boundary encompassing a particular geolocation. In other embodiments registration of the IoT device 101 may be dependent upon the location of the IoT device 101 to reside within a specific geolocation and if the IoT device 101 is positioned within the designated geolocation, then the IoT device 101 can be registered to the IoT platform 153, otherwise registration may be denied by the provisioning service 109. For example, registering an IoT device 101 as part of an athletic competition, such as a marathon to track the locations and/or monitor the health of runners participating. The IoT device 101 may only be able to be registered to the IoT platform 153 while the participant is within the geolocation of the event taking place.

In another alternative embodiment, the geolocation may be taken into account along with one or more additional elements of the metadata 152 when rules are being applied to the IoT device 101 during registration. Using the athletic competition example above, the IoT device 101 may be subject to a rule wherein registration is permitted within a particular geolocation and during a set time frame on or around the start of the competition. For instance, a runner participating in a marathon may be able to register the IoT device 101 prior to or on the day of the event while residing within the geolocation. Otherwise, device registration could be denied if the runner attempts to register the IoT device 101 in a location that falls outside the geolocation and/or timeframe described by the rules maintained by the rules registry 119.

Embodiments of IoT devices 101 may seek registration with one or more IoT platforms 153 within a computing environment 100, 180, 190, 200, 350. An IoT platform 153 may refer supporting software that connects hardware (such as the IoT device 101), access points and networks 150 to end-user applications loaded in the memory 105 or accessible via the IoT platform 153. An IoT platform 153 may handle management tasks and data visualization, allowing users to automate the physical environment and computing environment 100, 180, 190, 200, 350. Embodiments of the IoT platform 153 may perform a plurality of functions within the computing environment 100, 180, 190, 200, 350, including the functions of a data controller, a gateway device, a communications network, data analyzer, data translator and/or an application service (including an end-user application or the provisioning service 109 in some embodiments). Embodiments of the IoT platform 153 can act as middleware between the remotely connecting IoT devices 101 and one or more applications or devices that may be connected or accessible via the IoT platform 153.

Embodiments of an IoT platform 153 may be responsible for enabling one or more functions of the IoT device 101 registered to the IoT platform 153. For example, an IoT platform 153 can equip or enable IoT devices 101 with real-time monitoring functions, remote control functionality, configurable alerts, notifications and pluggable cloud services. Embodiments of an IoT platform 153 may also integrate IoT devices 101 with mobile computing devices, smartphone technologies and applications. Additional examples of IoT platform applications in the realm of IoT devices 101 may include remote monitoring of IoT devices 101 and vehicles equipped with IoT devices 101, predicting maintenance on equipment, collecting sensor data for real-time analytics in the field of healthcare, hospitality and travel including monitoring the end-end movement of physical good/products. IoT platforms 153 may harness large networks of registered IoT devices 101 for large-scale solutions, including using a network of IoT devices 101 for smart city infrastructure, and public services including electric grid metering, air quality monitoring and controlling the functionality of "smart" buildings.

Embodiments of an IoT platform 153 may also be referred to as an IoT cloud when the IoT platform 153 operates using a cloud computing environment 350 as described in detail above. An IoT platform 153 operating as an IoT cloud may be utilized as a platform-as-a-service (PaaS). An IoT PaaS may allow for users and clients to rent cloud infrastructure, the IoT platform 153 and even the IoT device 101 all from a single technology provider.

Referring back to the drawings, embodiments of the computing environments 100, 180, 190, 200, 350 may comprise a provisioning service 109. The location of the provisioning service 109 may vary from embodiment to embodiment, as shown in the drawings of FIG. 1a-1c. For example, in FIG. 1a, the provisioning service 109 may be integrated into a provisioning module 131 of an IoT administrative system 110. In alternative embodiments such as the computing environment 180, 190 of FIG. 1b-1c, the provisioning service 109 may be integrated into a provisioning server 130. Embodiments of the provisioning server 130 may be a separate computing system from the IoT administrative system 110. In some embodiments, the provisioning service 109 may be integrated into one or more computer systems running or delivering the content of the IoT platform 153. In additional embodiments, the provisioning server 130 running the provisioning service 109 may be a virtualized computer system that may be hosted by IoT administrative system 110 or one or more IoT platforms 153.

Embodiments of the provisioning service 109 may perform the function or tasks associated with registering one or more IoT devices 101 requesting access to one or more IoT platforms 153. The provisioning service 109 may be the first point of contact between the an unprovisioned IoT device 101 during the performance of the registration of IoT devices 101, and the provisioning of resources to the IoT device 101. Furthermore, the provisioning service 109 may mediate communications between the IoT device 101 and the IoT platform 153 prior to the registration of the IoT device 101. Embodiments of the provisioning service 109 may include one or more sub-components, services, or programs to complete the tasks and functions of registering the IoT device 101. Examples of the sub-components, services or programs may include, but is not limited to, a rules engine 117, a rules registry 119 and/or provisioning log 121, as shown in FIGS 1*a*-4.

Embodiments of the rules engine 117 may perform one or more core functions of the provisioning service 109 while registering each of the IoT devices 101 with one or more IoT platforms 153. The rules engine 117 may be an application that manages the decision-making process of the registration procedure using a pre-defined logic or dynamically evolving machine learned logic, to implement the rules of the rules registry 119. Embodiments of the rules engine 117 may allow for users and administrators with access to the rules engine 117 to define, edit and amend the logic of the rules engine 117. Embodiments of the rules engine 117 may be presented as a tool usable by users and administrators that may not have any programming knowledge and may be easy to configure using a simple, easy to understand interface. In some embodiments, rules engine 117 may include a repository for storing each of the rules defined by users or administrators (I.e., a rules registry 119), and a rule editor for creating, modifying and deleting rules of the rules registry 119.

Embodiments of the rules engine 117 may act as the liaison between the provisioning service 109 and the rules registry 119. The rules engine 117 may process incoming credentials 150 and metadata 152 received from each IoT device 101. The embodiments of the rules engine 117 may verify the credentials 150 being transmitted by IoT devices 101 as authentic or not. For example, by matching the public or private keys, and/or digital signatures embedded in digital certificates, signed objects, or tokens, with the validated keys or signatures provided by the authority responsible for issuing the credentials 150. In some embodiments, the provisioning service 109 may contact one or more IoT platforms 153 responsible for issuing or maintaining a credentials database 155 comprising authenticated credentials 150. The IoT platform 153 may compare the credentials 150 with the verified credentials of the credentials database 155 and confirm to the provisioning service 109 whether or not the credentials 150 presented by the IoT device 101 are in fact authentic.

Embodiments of the rules engine 117, acting as a liaison between the rules registry 119 and provisioning service 109 may perform the task of querying the rules registry 119, matching one or more rules of the rules registry 119 with the IoT device 101, as a function of the metadata 152, and generate a rules statement instructing the provisioning service 109 how to apply each of the applicable rules of the rules registry 119 to the IoT device 101 seeking registration. For example, a provisioning service 109 may transmit a request to the rules engine 117 to lookup rules for a particular IoT device 101 using supplied metadata 152 as a basis of the fields for defining the query of the rules registry 119. The request of the provisioning service 109 may be made using a system call to the rules engine 117 to perform the requested action. Embodiments of the rules engine 117 may define the query to the rules registry 119 as a function of the metadata 152. Upon receipt of the results of the query from the rules registry 119 the rules engine 117 may construct a rules statement, which may be a set of instructions constructed as an expression of the rules, instructing the provisioning service 109 how to register and provision resources to the IoT device 101. The rules engine 117 may respond to the system call of the provisioning service 109 by transmitting the rules statement back to the provisioning service 109 for implementation of the rules on the IoT device 101 in accordance with the rules statement.

In some embodiments, the rules engine 117 may construct the parameters of the query submitted to the rules registry 119 using the elements of the set of metadata 152 transmitted by IoT device 101. In other instances, a second set of metadata 152 may be obtained from the IoT platform 153 to further add to or modify the parameters of the search query being made by the rules engine 117. The provisioning service 109 may transmit a system call to the IoT platform 153, requesting additional metadata 152 that may be stored by the IoT platform 153. The second set of metadata 152 may be retrieved from the IoT platform 153 and sent back to the provisioning service 109. The provisioning service 109 may transmit a system call for a lookup of the rules by the rules engine 117. However, instead of transmitting only the set of metadata 152 received from the IoT device 101, the rules engine 117 may receive the set of rules from the IoT device 101 and the second set of metadata 152 received from the IoT platform 153. In some embodiments, the first set of metadata 152 and the second set of metadata 152 may include the same elements. In alternative embodiments, the second set of metadata 152 may further include additional elements describing the IoT device 101, which may assist in constructing a more detailed or expanded query which can be presented to the rules registry 119 by the rules engine 117. Expanding the possibility of identifying one or more rules that may be applicable to the IoT device 101.

Embodiments of the rules registry 119, may be a repository, such as a database, storing one or more rules or sets of rules for handling, provisioning resources and/or granting IoT platform 153 access to one or more IoT devices 101. The rules stored by the rules registry 119 may be simple or complex rules in some embodiments. Some of the rules may be applicable to each IoT device 101, whereas other rules may only be applicable to particular categories, types or brands of IoT devices 101 having one or more distinct features. Embodiments of the rules stored by the rules registry 119 may be written in a variety ways using multiple options of markup languages to express the rules. For example, the rules may be written using XML, JSON, JSONata, hypertext markup language (HTML), eXtended hypertext markup language (XHTML), RuleML, Business Rules Markup Language (BRML), or any other language known or used by a person skilled in the art.

Embodiments of the rules stored by the rules registry 119 may control and manage several aspects of the IoT device 101 being registered to the IoT platform 153. The rules may define which IoT devices 101 are or are not considered acceptable to connect to an IoT platform 153. For example, through the generation of an approved list comprising approved IoT devices 101 and a banned list of disapproved IoT devices 101. Elements for considering whether a IoT device 101 may be approved listed or banned listed may include elements such as the IoT device's 101 IP address, MAC address, typeID, preregistration_ID, geolocation or any other element of the metadata 152 that may indicate that the IoT device 101 may be considered unsecure or a security threat to the IoT platform 153.

Additional aspects of IoT devices 101 that may be controlled or managed based on the rules of the rules registry 119 may include the creation and administration of passwords or password policies (i.e., assigning passwords based on a pre-determined set of rules), callback rules (i.e., setting a requisite number of handshakes or particular handshaking protocol between the provisioning service and IoT device 101 before registration), location-based provisioning (i.e., using geo-fencing) and time-based registration wherein the IoT device 101 may only be activated for a certain period of time before the IoT device 101 become deactivated. In some embodiments of the rules may control the cyclic decommissioning and/or re-registration of IoT devices 101, whereby a previously registered IoT device may be required to decommission and re-register with the IoT platform 153 after a period of time specified by the rules.

Moreover, in some embodiments of the rules may improve customization and security of each IoT device 101 and may vary depending on the IoT device 101 being registered. For example, some IoT devices 101 may be subject to registration approval rules, wherein one or more organizations that utilize the IoT device 101 may have final approval over the registration of the IoT device 101 on the organization's IoT platform 153. In other instances, the rules may control the issuance and replacement of credentials 150. For example, a rule may require that IoT devices 101 registering with an IoT platform 153 be issued a new certificate to use as credentials 150 to connect to the IoT platform 153, rather than continuing to use a default credential 150 that may have been embedded onto the IoT device 101 at the time of manufacturing. In some embodiments, the rules registry 119 may comprise overriding provisions and options that may allow for the IoT device 101 to circumvent or ignore one or more rules of the rules registry 119. As mentioned above, through the use of a custom rule that may be part of the metadata 152. For example, a deviceID for an IoT device 101 could be generated based on the typeID, wherein if the typeID is a particular type for the IoT device 101 being registered, the deviceID could be set to a combination of the typeID, a randomly generated number and a timestamp added by the rules engine 117.

Referring to the drawings, FIG. 6b depicts an example of a snippet of a set of rules written in a markup language. As shown in the drawings, the ruleID may define the name of the rule within the set of rules, which may be followed by a description of the rule and an expression of the rule to be followed by the rules engine 117. As shown in the example of FIG. 6b, rule01 may be the first rule within a set of rules. Rule01 in the example is described as a group of various lists and from the body portion of the rule, the lists include banned lists and approved lists for certain IoT devices 101, wherein certain IoT devices 101 falling within a particular IP or MAC address specified in the rule are considered to be allowable (approved listed) or banned (banned listed) from registering with the IoT platform 153.

In second example of a rule within a set of rules maintained by a rules registry 119, a second rule having a ruleId entitled rule02, describes a policy for generating a password for each IoT device 101 registering with an IoT platform 153. The rule in this particular example prescribes the generation of a password in accordance with the password policy by using the typeID, a randomly generated number and a timestamp.

Embodiments of the provisioning service 109 may further comprise a provisioning log 121. The provisioning log 121 may record one or more events that may occur during the registration of IoT device 101. The provisioning log 121 may store the events recorded in a log file which may describe the details of the provisioning steps for users or administrators to view the content of the log file and recount the automated data collection, time of each event and the type of actions taking place in accordance with the registration of each IoT device 101. For example, the provisioning log 121 may record details regarding the registration request by the IoT device 101, the generation and of the rules statement by the rules engine 117, the receipt of the rules statement by the provisioning service 109, requests for additional sets of metadata 152, credentials 150 and/or security tokens from one or more IoT platforms 153, the receipt of credentials 150, metadata 152 and/or security tokens from the IoT platforms 153 and/or the provisioning log may log the return of the credentials, deviceID, security tokens, etc. being provisioned to the IoT device 101.

In some embodiments, the computing environments 100, 180, 190, 200, 350 may comprise an IoT administrative system 110 as depicted in FIGS. 1a-1c. The components, modules, hardware and software that may comprise the IoT administrative system 110 may vary from embodiment to embodiment. For example, in FIG. 1a, the IoT administrative system 110 may be equipped with a provisioning module 131 which may comprise the provisioning service 109 equipped with a rules engine 117, rules registry 119 and/or the provisioning log 121 in addition to a reporting engine 123 and API keys 125. In alternative embodiments, one or more components, modules or programs loaded into the persistent storage 106 of the IoT administrative system 110 may be integrated into a separating computing system or virtualized system. For example, in some embodiments, such as the embodiment of FIG. 1b-1c, the provisioning service 109 controlling the registration of one or more IoT devices 101 on or more IoT platforms 153 may be integrated into a provisioning server 130 that may be separate from the IoT administrative system 110. Whereas in other embodiments, such as the embodiment of FIG. 1a, the provisioning service 109 may be integrated into the provisioning module 131 of the IoT administrative system 110.

In addition to the provisioning service 109, which may be integrated into the IoT administrative system 110, embodiments of the IoT administrative system 110 may include a reporting engine 123 and one or more API keys 125. Embodiments of the reporting engine 123 may perform the function or task of allowing a user or administrator the ability to directly query the rules registry 119 of the provisioning service 109, return a list of rules currently stored by the rules registry 119 and dynamically edit rules, delete rules or add new rules to the rules registry 119. Embodiments of the API keys 125 may provide access to each rules registry 119 that may be associated with and/or store rules designed for each of the one or more of the IoT platforms 153.

The IoT administrative system 110 may access or edit the rules registry 119 by transmitting an API call to the provisioning service 109 requesting access to one or more particular rule registries 119 that may be of interest to a user or administrator of the IOT administrative system 110. Through the reporting engine 123, a user or administrator may dynamically change, amend, delete or add rules. For example, through one or more tools or interfaces displaying the rules, the markup language of the rules or through editable interface objects, that may be easily navigated by a user or administrator, wherein changes to the editable interface objects changes the rules accordingly. For instance, a text box designated as a banned list or approved list may be an editable interface object that may allow for a user or administrator to enter in an IP address or MAC addresses to be added to the banned list or approved list rule in response to the edits made accordingly.

Dynamic changes to the rules registry 119 by a user or administrator through the rules engine 117 may dynamically alter the registration of currently registered IoT devices 101 and/or IoT devices registered in the future. In some embodiments, as one or more rules of the rules registry 119 are changed, deleted or new rules are added, the IoT devices 101 that have been registered in accordance with the previous rules may be updated and registered according the changes and modifications made most recently to the rules of the rules registry 119. Moreover, as new IoT devices 101 connect to the provisioning service 109, the IoT devices 101 may each be registered in accordance with the most up-to-date version of the rules that apply to the IoT device 101 seeking registration.

Method for Registering IoT Devices

Figure 5A:
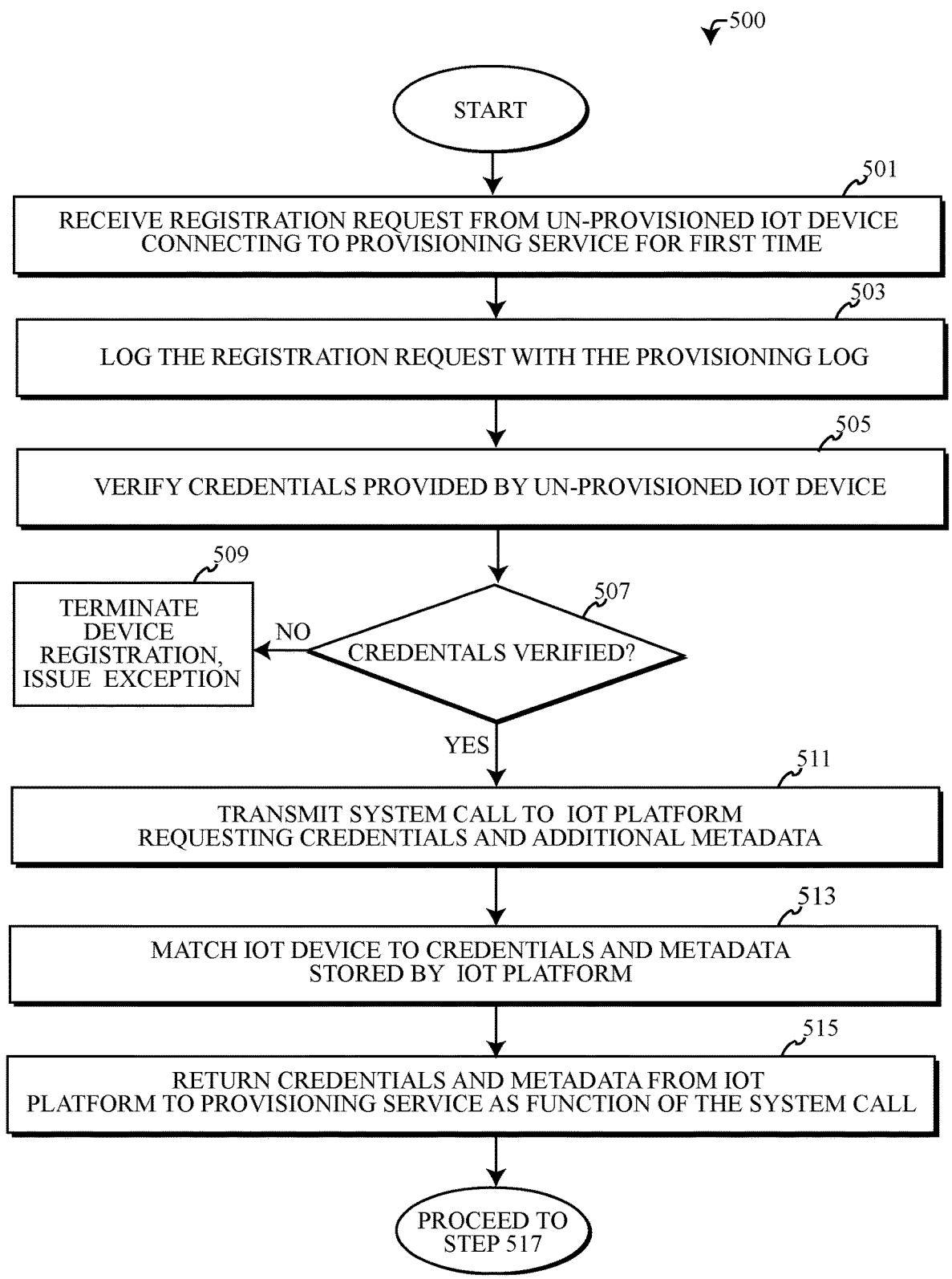
FIG. 5a is a flow diagram describing an embodiment of a computer implemented method in accordance with the present disclosure.
Figure 5B:
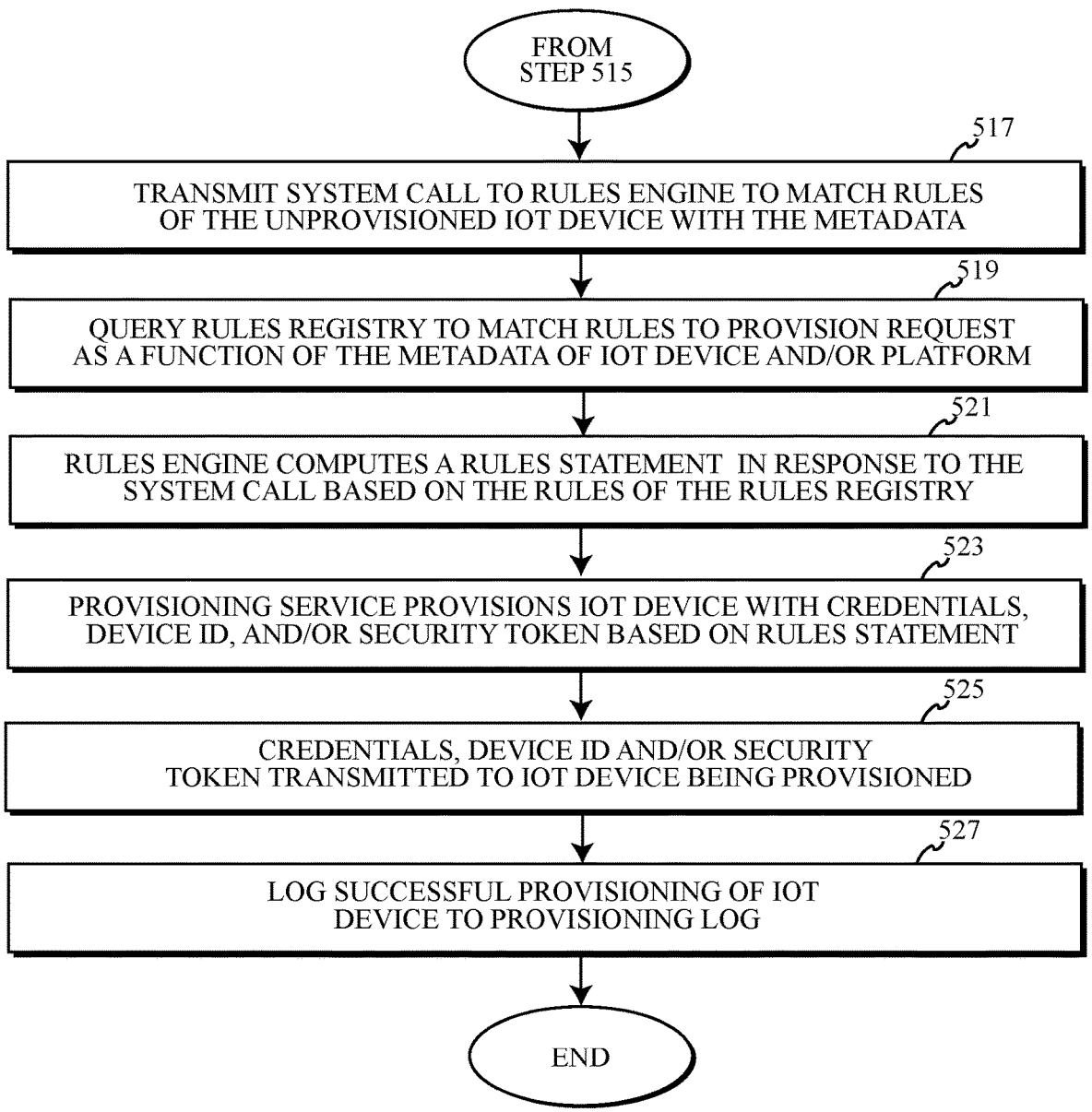
FIG. 5b is a flow diagram continuing to describe the embodiment of the computer implemented method of FIG. 5a in accordance with the present disclosure.

The drawings of FIG. 5*a*-5*b* represent embodiments of methods for registering IoT devices 101 operating in a computing environment 100, 180, 190, 200, 350 as described in FIGS. 1*a*-4, 6*a*-6*b* using one or more computer systems as defined generically by computer system 700 of FIG. 7 below and more specifically by the embodiments of specialized computer systems, such as IoT device 101, IoT administrative system 110, provisioning server 130 and/or the IoT platform 153 depicted in FIGS. 1*a*-4 and as described herein. A person skilled in the art should recognize that the steps of the method described in FIGS. 5*a*-5*b* may be performed in a different order than presented and the methods of FIGS. 5*a*-5*b* may not require all the steps described herein to be performed. Rather, some embodiments may alter the methods by using one or more of the steps discussed below.

Figure 2:
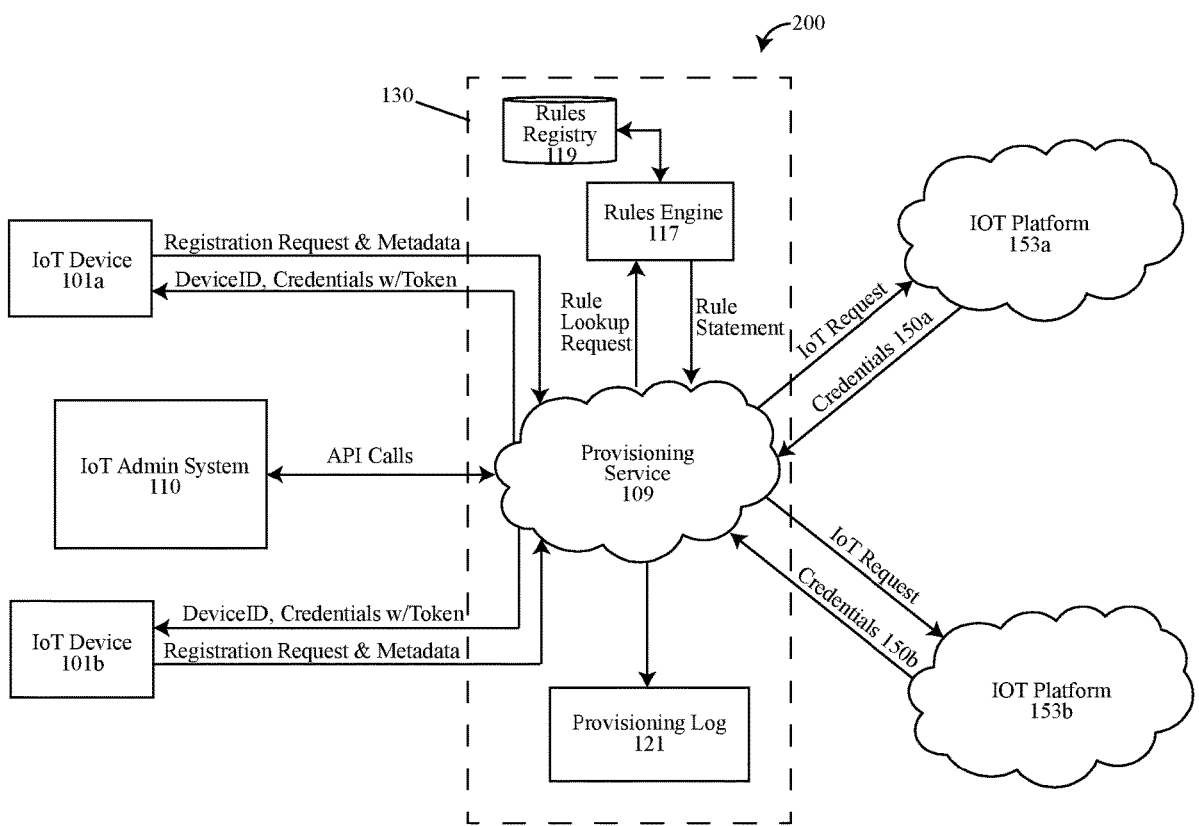
FIG. 2 depicts a workflow diagram describing an embodiment of a method for automating the provisioning of an IoT device.

FIG. 5*a* represents a flowchart illustrating a first portion of a method 500 for registering an IoT device 101 to a computer network 160, in accordance with the embodiments of the present disclosure. The embodiment of the method 500 may begin at step 501. In step 501, a provisioning service 109 may receive a request from an un-provisioned IoT device 101 to register the IoT device 101 with one or more IoT platforms 153. The request from the IoT device 101 may be performed because the IoT device 101 is connecting to the provisioning service 109 for the first time or the request may be submitted to the provisioning service 109 because the IoT device's 101 previous registration has expired (i.e., in accordance with a time-dependent rule of the rules registry 119). The IoT device 101 may be connect to the provisioning service 109 via a URL that may be embedded on the IoT device 101 by the manufacturer and/or made available to the IoT device 101 by the IoT platform 153. As shown in FIG. 2, the registration request may be accompanied by a set of credentials 150 and metadata 152 that may be received by provisioning service 109 as part of the registration request.

In step 503 of method 500, the incoming registration request from one or more IoT devices 101 may be logged with the provisioning log 121 of the provisioning service 109. The provisioning log 121 may record information associated with the registration request including the date and time of the registration request, and whether metadata 152 accompanied the request. The provisioning log 121 may further record one or more elements describing the IoT device 101 that may be have been present in the metadata 152, including the IP address, MAC address, geolocation, preregistration_ID, typeID, and classID of the IoT device 101. Embodiments of the provisioning log 121 may be capable of tracking, organizing, formatting and/or cross referencing logged events associated with reoccurring IoT device 101 registration requests.

In step 505 of method 500, the provisioning service 109 may verify the credentials 150 received from the un-provisioned IoT device 101 submitting the registration request. The credentials 150, which may be in the form of digital certificates, signed objects comprising a digital signature or security tokens in some embodiments, may be verified by authenticating the public or private keys, digital signatures or security tokens. The provisioning service 109 may securely validate the credentials by matching the keys, signatures and tokens of the credentials 150 with the authenticated values issued by the issuing authority responsible for issuing the credentials 150 used by the IoT device 101. If the credentials 150 match the values issued by the credentials issued by the issuing authority, then the credentials may be considered verified.

In some embodiments of step 505, the verification of the credentials 150 may further include a step wherein the provisioning service 109 submits a verification request to one or more IoT platforms 153 that may have matching or verified credentials that may be used to further validate the credentials 150 received by the provisioning service 109. Upon receipt of the verification request from the provisioning service 109, the IoT platform 153 may query a credentials database 155 for a matching set of credentials 150 to the credentials 150 transmitted by the provisioning service 109 as part of the verification request. If, the IoT platform 153 matches the credentials 150 to a verified set credentials stored by the credentials database 155, the IoT platform 153 may respond to the verification request positively authenticating the credentials 150 as legitimate, and in some embodiments, the IoT platform 153 may return a verified set of credentials to the provisioning service 109.

In step 507 of method 500, a determination may be made whether or not the credentials 150 have been verified as authentic. The authenticity of the credentials may be validated by the provisioning service 109, IoT platform 153, the issuing authority of the credentials 150 and/or a combination of verifiers thereof. If the credentials 150 are identified as inauthentic in step 507, the method 500 may proceed to step 509, wherein the provisioning service 109 may terminate the registration request of IoT device 101, issuing an exception. The termination of the registration request may be recorded by the provisioning log 121 and the provisioning service 109 may add one or more elements of the metadata 152 describing the IoT device 101, to a banned list which may further prevent the IoT device 101 from achieving registration in the future.

Conversely, if the credentials 150 are verified in step 507 as being authentic, the method 500 may proceed to step 511 in some embodiments. In alternative embodiments, the provisioning service may move on to step 517. In the example of the method shown in FIG. 5a, method 500 may proceed to step 511. In step 511, the provisioning service 109 may request additional credentials stored by the IoT platform 153 (if the provisioning service 109 had not previously done so as described above) and a second set of metadata 152 which may be stored by or accessible to the IoT platform 153. Embodiments of the provisioning service may transmit the request by making a system call to one or more IoT platforms 153 that the IoT device 101 may be attempting to register.

In step 513 or method 500, the one or more IoT platforms 153 receiving the system call from the provisioning service may proceed to match the credentials 150 and/or metadata from the IoT device 101 to credentials 150 or metadata 152 stored by, or accessible to, the IoT platform 153. Embodiments of the IoT platform 153 may query one or more databases, matching one or more elements of the IoT device 101 described in the metadata 152 and/or the credentials 150 to one or more records accessible to the IoT platform 153. If the query successfully matches the credentials 150 and/or metadata to one or more records (e.g. a second set of metadata 152 or verified credentials of the IoT device 101) the method may proceed to step 515, wherein the IoT platform 153 may return the second set of metadata 152 and/or the credentials 150 to the provisioning service 109 in response to the system call transmitted in step 511.

In step 517, the provisioning service 109 may call the rules engine 117 to perform a rule lookup by matching one or more rules of the unprovisioned IoT device 101 with one or more sets of metadata 152. For example, the rules engine may match the expression of one or more rules maintained by the rules registry, to the IoT device 101, based on the set of metadata 152 received from the IoT device 101, a second set of metadata 152 received from the IoT platform 152 or a combination of metadata sets.

In step 519 of method 500, the rules engine 117 may construct a query and transmit said query to the rules registry 119. The parameters of the query constructed by the rules engine 117 may seek to match one or rules stored by the rules registry 119 to one or more sets of metadata 152, by matching the expression of one or more rules to one or more elements of the metadata 152. For example, by matching IP addresses, MAC address, preregistration_ID's, typeIDs, classIDs, geolocation, etc. to rules having one or more matching elements or IoT device 101 categories. In some embodiments, one or more rules may be intended only to affect specific types or brands of IoT devices 101. In such a situation, the rules registry 119 may identify the rules that apply to the specific IoT device 101. For example, by matching a specific rule intended for a particular typeID or pre_registrationID. Likewise, other rules may be universally applied to all IoT devices 101 seeking registration, but the outcome of the rule may be dependent on one or more elements of the set(s) of metadata 152. For example, a rule expressing the password policy for a particular IoT platform 153 can be applied to each IoT device 101, but the generated password can differ based on the elements of the IoT device's 101 metadata 152, as shown in FIG. 6b wherein a password is dependent upon a typeID, random number and timestamp.

In response to the query performed in step 519 as a function of one or more sets of metadata 152, the rules registry 119 may return the query results comprising one or more rules that are applicable to the IoT device 101 seeking registration. Embodiments of the rules engine may in step 521 compute a rules statement as a function of the rules returned in the query of step 519. The rules statement computed by the rules engine 117 may comprise one or more sets of instructions to the provisioning service 109 for implementing the expressions of the rules of the rules registry 119 in order to properly register IoT device 101. For example, one of the rules returned by the query may include an instruction to generate a deviceID for the IoT device 101 by combining the typeID of the IoT device 101 and a random number to generate the device ID. The rules statement computed by the rules engine 117 may include an instruction to the provisioning service to set the deviceID in the credentials 150 for the IoT device 101 based on the deviceID rule, unless there is another rule that may override, such as a customRule establishing a different deviceID.

In another example, the query of step 519 may return a rule from a banned list that that designates a particular IP address or MAC address as being un-registerable to an IoT platform, i.e., for security reasons. During the computation of the rules statement, the rules engine 117 may apply a known IP or MAC address of the IoT device 101 to the rule. It may be determined that the IP address of the IoT device 101 meets the rule's criteria for being banned listed, therefore, as part of the rules statement generated by the rules engine 117, the rules engine 117 may instruct the provisioning service 109 to deny registration of the IoT device 101. Likewise, a similar expression of a rule may occur using geolocation, wherein a geolocation listed in one or more sets of metadata 152 may identify a location of an IoT device 101 that may fall within a geolocation described by a rule. During the computation of the rules statement, the rules engine 117 may determine that such a rule should be applied based on geolocation and subsequently the rules engine 117 as part of the rules statement, may instruct the provisioning service 109 to act in accordance with the rule.

In step 523 of method 500, the provisioning service 109 may receive the rules statement generated in step 521 from the rules engine 117. The provisioning service 109 may proceed to apply the instructions of the rules statement, thus expressing the rules of the rules registry to provision the IoT device 101. Embodiments of step 523 may include generating credentials 150, a deviceID, user ID/passwords and/or security tokens, that may allow the IoT device 101 to access the IoT platform 153, consistent with the instructions of the rules statement. For example, one instruction of the rules statement generated in step 521 may set a limited time period for IoT device 101 to remain registered with IoT platform 153. The provisioning service in step 523 may apply the limited time period instruction of the rules statement by issuing a set of credentials 150 to the IoT device 101 that expire within the time period specified in the rule. In another example, a rules statement may instruct the provisioning service 109 to delay registration of the IoT device 101 for a set period of time. In accordance with the rules statement, the provisioning service 109 may delay the generation of the credentials 150 being sent to the IoT device 101 until such a time period has been met, or in some embodiments, the provisioning service 109 may issue credentials that become valid as of a particular time in the future that is consistent with the rule instructing the provisioning service 109 to delay access of the IoT device 101 to the IoT platform 153.

In step 525 of method 500, the provisioning service 109 may transmit the credentials 150, deviceID, security tokens and other materials expressing the rules of the rules registry 119 and authorization provisioned to the IoT device 101 in order to access one or more IoT platforms 153 to the IoT device 101. Based on the materials and access provisioned to the IoT device 101, the IoT device 101 may or may not be authorized to access the IoT platform 153. In step 527, the provisioning service 109 may log the registration of the IoT device 101 and/or the resources provisioned to the IoT device 101 as a result of the registration process, in the provisioning log 121.

Computer System

FIG. 7 is a block diagram of internal and external components of a computer system 700, which may be representative of the one or more computer systems depicted in the computing environment 100, 180, 190, 200, 350 as shown in FIGS 1a-4, in accordance with the embodiments of the present disclosure. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 700 may include communications fabric 702, which provides for communications between one or more processors 103, memory 105, persistent storage 106, communication unit 111, and one or more input/output (I/O) interfaces 113. Communications fabric 702 can be implemented with any architecture designed for passing data and/or control information between processors 103 (such as microprocessors, communications and network processors, etc.), system memory 105, external devices 116, and any other hardware components within a system. For example, communications fabric 702 can be implemented with one or more buses.

Memory 105 and persistent storage 106 may be computer-readable storage media. Embodiments of memory 105 may include random access memory (RAM) 107 and cache 108 memory. In general, memory 105 can include any suitable volatile or non-volatile computer-readable storage media. Software, such as a program 721 may be stored in persistent storage 106 for execution and/or access by one or more of the respective processors 103 via one or more devices of memory 105. Such software programs 721 can include a provisioning service 109, rules engine 117, rules registry 119, provisioning log 121, reporting engine 123, one or more API keys 125, and/or an IoT platform 153.

Persistent storage 106 may include, for example, a plurality of magnetic hard disk drives. Alternatively, or in addition to magnetic hard disk drives, persistent storage 106 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communication unit 111 provides for communications with other computer systems or devices via a network (e.g., network 160). In the exemplary embodiment, communication unit 111 may include network adapters or interfaces such as a TCP/IP adapter cards, wireless Wi-Fi interface cards, 3G, 4G, or 5G wireless interface cards or other wired or wireless communication links. The network 160 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 180, 190, 200, 350 or computer system 700 through communication unit 111 (e.g., via the Internet, a local area network or other wide area network). From communication unit 111, the software and data can be loaded onto persistent storage 106.

One or more I/O interfaces 113 may allow for input and output of data with other devices that may be connected to computer system 700. For example, I/O interface 113 can provide a connection to one or more external devices 116 such as one or more IoT devices 101 as well as other input devices such as a keyboard, computer mouse, touch screen, virtual keyboard, touch pad, pointing device, or other human interface devices. External devices 116 can also include portable computer-readable storage media such as, for example, thumb drives, portable optical or magnetic disks, and memory cards. I/O interface 113 may also connect to display 118. Display 118 provides a mechanism to display data to a user and can be, for example, a computer monitor or screen. Display 118 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
   receiving, by an internet-of-things (IoT) provisioning service, a registration request from an IoT device, wherein said IoT provisioning service is mediating communications between an IoT device and an IoT platform acting as middleware supporting software connecting hardware of the IoT device to an end-user application prior to registration of the IoT device;
   receiving, by the IoT provisioning service, credentials and a set of metadata from the IoT device comprising geolocation of the IoT device;
   verifying, by the IoT provisioning service, the credentials are authentic;
   calling, by the IoT provisioning service, a rules engine of the IoT provisioning service to query a rules registry for one or more rules applicable to the IoT device;
   querying, by the rules engine of the IoT provisioning service, the rules registry for one or more rules that match the set of metadata of the IoT device, wherein rules for the IoT device are triggered by the IoT device being within an established geofence having a boundary encompassing the geolocation of the IoT device provided by the set of metadata, wherein registration of the IoT device is dependent upon location of the IoT device within a specific geolocation, otherwise the registration is denied;

computing, by the rules engine of the IoT provisioning service, a rules statement in response to querying the rules registry, said rules statement expressing the rules for the IoT device that are triggered by the IoT device being within the established geofence and instructing the provisioning service how to apply the rules of the rules registry to the IoT device and provision resources to the IoT device;

registering, by IoT provisioning service, the IoT device with connection credentials, and a device ID as a function of an expression of the one or more rules, with an IoT platform operating as an IoT cloud utilizing platform-as-a-service (PaaS), enabling real-time monitoring functions and pluggable cloud services of the IoT device registered to the IoT platform;

recording to a provisioning log, by the IoT provisioning service, details regarding the registration request from the IoT device, generation of the rules statement by the rules engine, receipt of the rules statement by the provisioning service, connection credentials and device ID of the IoT device;

transmitting, by the IoT provisioning service, the connection credentials, and the device ID to the IoT device;

amending one or more rules of the rules registry to amended rules; and automatically re-provisioning, by the IoT provisioning service, the IoT device as a function of the amended rules.

2. The computer-implemented method of claim 1, wherein the one or more rules are dynamically updatable rules selected from the group consisting of an approved list, a banned list, password policies, callback rules and a combination thereof.

3. The computer-implemented method of claim 1, wherein the one or more rules are dynamically updatable rules selected from the group consisting of time-based registration, delayed registration, final approval, certificate replacement and a combination thereof.

4. The computer-implemented method of claim 1, further comprising the steps of:

transmitting, by the IoT provisioning service, a system call to the IoT platform, wherein the system call requests verified credentials and a second set of metadata stored by the IoT platform, associated with the IoT device;

matching the IoT device to the verified credentials and the second set of metadata stored by the IoT platform; and receiving, by the IoT provisioning service, the verified credentials and the second set of metadata from the IoT platform, wherein the second set of metadata stored by the IoT platform further adds or modifies parameters of a search query being made by the rules engine using the set of metadata provided by the IoT device, said second set of metadata including additional elements describing the IoT device which construct a more detailed or expanded query of the rules registry by the rules engine.

5. The computer-implemented method of claim 4, wherein the step of querying further comprises:

querying, by the IoT provisioning service, the rules registry for the one or more rules that match an expanded search query comprising parameters of the first set of metadata as provided by the IoT device and the second set of metadata received from the IoT platform comprising the additional elements describing the IoT device.

6. The computer-implemented method of claim 1, wherein an element of the set of metadata is selected from the group consisting of a preregistration_ID, typeID, a callbackURL a custom rule and a combination thereof.

7. A computer system comprising:

a processor;

an internet-of-things (IoT) device placed in communication with the processor; and a non-transitory computer-readable storage media coupled to a processor, wherein the non-transitory computer readable storage media contains program instructions executing a computer-implemented method comprising the steps of:

receiving, by an IoT provisioning service, a registration request from the IoT device, wherein said IoT provisioning service is mediating communications between an IoT device and an IoT platform acting as middleware supporting software connecting hardware of the IoT device to an end-user application prior to registration of the IoT device;

receiving by the IoT provisioning service, credentials and a set of metadata from the IoT device comprising geolocation of the IoT device;

verifying by the IoT provisioning service, the credentials are authentic;

calling, by the IoT provisioning service, a rules engine of the IoT provisioning service, query a rules registry for one or more rules applicable to the IoT device;

querying by the rules engine of the IoT provisioning service, the rules registry for one or more rules that match the set of metadata of the IoT device, wherein rules for the IoT device are triggered by the IoT device being within an established geofence having a boundary encompassing the geolocation of the IoT device provided by the set of metadata, wherein registration of the IoT device is dependent upon location of the IoT device within a specific geolocation, otherwise the registration is denied;

computing, by the rules engine of the IoT provisioning service, a rules statement in response to querying the rules registry, said rules statement expressing the rules for the IoT device that are triggered by the IoT device being within the established geofence and instructing the provisioning service how to apply the rules of the rules registry to the IoT device and provision resources to the IoT device;

registering, by the IoT provisioning service, the IoT device with connection credentials, and a device ID as a function of an expression of the one or more rules with an IoT platform operating as an IoT cloud utilizing platform-as-a-service (PaaS), enabling real-time monitoring functions and pluggable cloud services of the IoT device registered to the IoT platform;

recording to a provisioning log, by the IoT provisioning service, details regarding the registration request from the IoT device, generation of the rules statement by the rules engine, receipt of the rules statement by the provisioning service, connection credentials and device ID of the IoT device;

transmitting, by the IoT provisioning service, the connection credentials, and the device ID to the IoT device;

amending one or more rules of the rules registry to amended rules; and automatically re-provisioning, by the IoT provisioning service, the IoT device as a function of the amended rules.

8. The computer system of claim 7, wherein the one or more rules are dynamically updatable rules selected from the group consisting of an approved list, a banned list, password policies, callback rules and a combination thereof.

9. The computer system of claim 7, wherein the one or more rules are dynamically updatable rules selected from the group consisting of time-based registration, delayed registration, final approval, certificate replacement and a combination thereof.

10. The computer system of claim 7, further comprising the step of:

transmitting, by the IoT provisioning service, a system call to a platform, wherein the system call requests verified credentials and a second set of metadata stored by the IoT platform, associated with the IoT device;

matching the IoT device to the verified credentials and the second set of metadata stored by the platform; and receiving the verified credentials and the second set of metadata from the platform wherein the second set of metadata stored by the IoT platform further adds or modifies parameters of a search query being made by the rules engine using the set of metadata provided by the IoT device, said second set of metadata including additional elements describing the IoT device which construct a more detailed or expanded query of the rules registry by the rules engine.

11. The computer system of claim 10, wherein the step of querying further comprises:

querying, by the IoT provisioning service, the rules registry for the one or more rules that match an expanded search query comprising parameters of the first set of metadata as provided by the IoT device and the second set of metadata received from the IoT platform comprising the additional elements describing the IoT device.

12. The computer system of claim 7, wherein an element of the set of metadata is selected from the group consisting of a preregistration_ID, typeID, a callbackURL a custom rule and a combination thereof.

13. A computer program product comprising:

one or more non-transitory computer readable storage media having computer-readable program instructions stored on the one or more non-transitory computer readable storage media, said program instructions executes a computer-implemented method comprising the steps of:

receiving, by a IoT provisioning service, a registration request from an internet-of-things (IoT) device, wherein said IoT provisioning service is mediating communications between an IoT device and an IoT platform acting as middleware supporting software connecting hardware of the IoT device to an end-user application prior to registration of the IoT device;

receiving, by the IoT provisioning service, credentials and a set of metadata from the IoT device comprising geolocation of the IoT device;

verifying, by the IoT provisioning service, the credentials are authentic;

calling, by the IoT provisioning service, a rules engine of the IoT provisioning service, to query a rules registry for one or more rules applicable to the IoT device;

querying, by the rules engine of the IoT provisioning service, the rules registry for one or more rules that match the set of metadata of the IoT device, wherein rules for the IoT device are triggered by the IoT device being within an established geofence having a boundary encompassing the geolocation of the IoT device provided by the set of metadata, wherein registration of the IoT device is dependent upon location of the IoT device within a specific geolocation, otherwise registration is denied;

computing, by the rules engine of the IoT provisioning service, a rules statement in response to the system call as a function of querying the rules registry, said rules statement expressing the rules for the IoT device that are triggered by the IoT device being within the established geofence and instructing the provisioning service how to apply the rules of the rules registry to the IoT device and provision resources to the IoT device;

registering, by IoT provisioning service, the IoT device with connection credentials, and a device ID as a function of an expression of the one or more rules, with an IoT platform operating as an IoT cloud utilizing platform-as-a-service (PaaS), enabling real-time monitoring functions and pluggable cloud services of the IoT device registered to the IoT platform;

recording to a provisioning log, by the IoT provisioning service, details regarding the registration request from the IoT device, generation of the rules statement by the rules engine, receipt of the rules statement by the provisioning service, connection credentials and device ID of the IoT device;

transmitting, by IoT provisioning service, the connection credentials, and the device ID to the IoT device;

amending one or more rules of the rules registry to amended rules; and automatically re-provisioning, by IoT provisioning service, the IoT device as a function of the amended rules.

14. The computer program product of claim 13, wherein an element of the set of metadata is selected from the group consisting of a preregistration_ID, typeID, a callbackURL a custom rule and a combination thereof.

15. The computer program product of claim 13, wherein the one or more rules are dynamically updatable rules selected from the group consisting of an approved list, banned list, password policies, callback rules, time-based registration, delayed registration, a final approval, certificate replacement and a combination thereof.

16. The computer program product of claim 13, further comprising the step of:

transmitting, by IoT provisioning service, a system call to a platform, wherein the system call requests verified credentials and a second set of metadata stored by the IoT platform, associated with the IoT device;

matching the IoT device to the verified credentials and the second set of metadata stored by the platform; and receiving, by IoT provisioning service, the verified credentials and the second set of metadata from the platform, wherein the second set of metadata stored by the IoT platform further adds or modifies parameters of a search query being made by the rules engine using the set of metadata provided by the IoT device, said second set of metadata including additional elements describing the IoT device which construct a more detailed or expanded query of the rules registry by the rules engine.

17. The computer program product of claim 16, wherein the step of querying further comprises:
    querying, by IoT provisioning service, the rules registry for the one or more rules that match an expanded search query comprising parameters of the first set of metadata as provided by the IoT device and the second set of metadata received from the IoT platform comprising the additional elements describing the IoT device.

* * * * *